United States Patent
Enduri et al.

(10) Patent No.: US 8,472,443 B2
(45) Date of Patent: Jun. 25, 2013

(54) PORT GROUPING FOR ASSOCIATION WITH VIRTUAL INTERFACES

(75) Inventors: Narender Enduri, Cupertino, CA (US); Michael Smith, San Jose, CA (US); Mark Bakke, Maple Grove, MN (US)

(73) Assignee: Cisco Technology, San Jose, CA (US)

( * ) Notice: Subject to any disclaimer, the term of this patent is extended or adjusted under 35 U.S.C. 154(b) by 826 days.

(21) Appl. No.: 12/589,495

(22) Filed: Oct. 23, 2009

(65) Prior Publication Data

US 2010/0290473 A1 Nov. 18, 2010

Related U.S. Application Data

(60) Provisional application No. 61/216,264, filed on May 15, 2009.

(51) Int. Cl.
*H04L 12/56* (2006.01)

(52) U.S. Cl.
USPC ............ 370/392; 370/400; 709/226; 709/238

(58) Field of Classification Search
None
See application file for complete search history.

(56) References Cited

U.S. PATENT DOCUMENTS

| | | | |
|---|---|---|---|
| 7,516,211 B1 | 4/2009 | Gourlay et al. | |
| 8,060,875 B1 * | 11/2011 | Lambeth | 718/1 |
| 2003/0014524 A1 | 1/2003 | Tormasov | |
| 2005/0182853 A1 * | 8/2005 | Lewites et al. | 709/238 |
| 2005/0281190 A1 * | 12/2005 | McGee et al. | 370/216 |
| 2006/0230407 A1 | 10/2006 | Rosu et al. | |
| 2007/0028244 A1 | 2/2007 | Landis et al. | |
| 2008/0056122 A1 * | 3/2008 | Madhi et al. | 370/216 |
| 2008/0117909 A1 * | 5/2008 | Johnson | 370/392 |
| 2008/0225877 A1 | 9/2008 | Yoshida | |
| 2008/0298274 A1 * | 12/2008 | Takashige et al. | 370/254 |

FOREIGN PATENT DOCUMENTS

EP 2017711 1/2009

* cited by examiner

*Primary Examiner* — Brian Roberts
(74) *Attorney, Agent, or Firm* — Cindy Kaplan

(57) ABSTRACT

In one embodiment, an apparatus includes a port channel manager for receiving information identifying switches connected to a group of physical ports at a network device and creating subgroups each comprising the physical ports connected to one of the switches. The apparatus further includes a virtual interface agent for assigning a virtual interface connecting a virtual switch to a virtual machine, to one of the subgroups. Traffic received from the virtual machine on the virtual interface is transmitted to one of the switches on one of the physical ports in the assigned subgroup. A method for grouping ports for association with virtual interfaces is also disclosed.

20 Claims, 7 Drawing Sheets

PORT GROUPING FOR ASSOCIATION WITH VIRTUAL INTERFACES

STATEMENT OF RELATED APPLICATION

The present application claims priority from U.S. Provisional Application No. 61/216,264, entitled ASYMMETRIC PORT CHANNEL AND VIRTUAL SWITCH DISCOVERY, filed on May 15, 2009. The contents of this provisional application are incorporated herein by reference in its entirety.

BACKGROUND

The present disclosure relates generally to communication networks, and more particularly, to grouping ports of a port channel for association with virtual interfaces.

Data centers often use a small percentage of available CPU, storage, and memory capacity. This results in deployment of more servers than are necessary to perform a specified amount of work. Additional servers increase costs and create a more complex and disparate environment that can be difficult to manage. Many data center managers are turning to virtualization so that resources can be shared across a network.

Virtualization is a technology which allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual machines sharing the same physical server hardware. Virtual switches provide network connectivity between the virtual machines and physical ports on the server.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
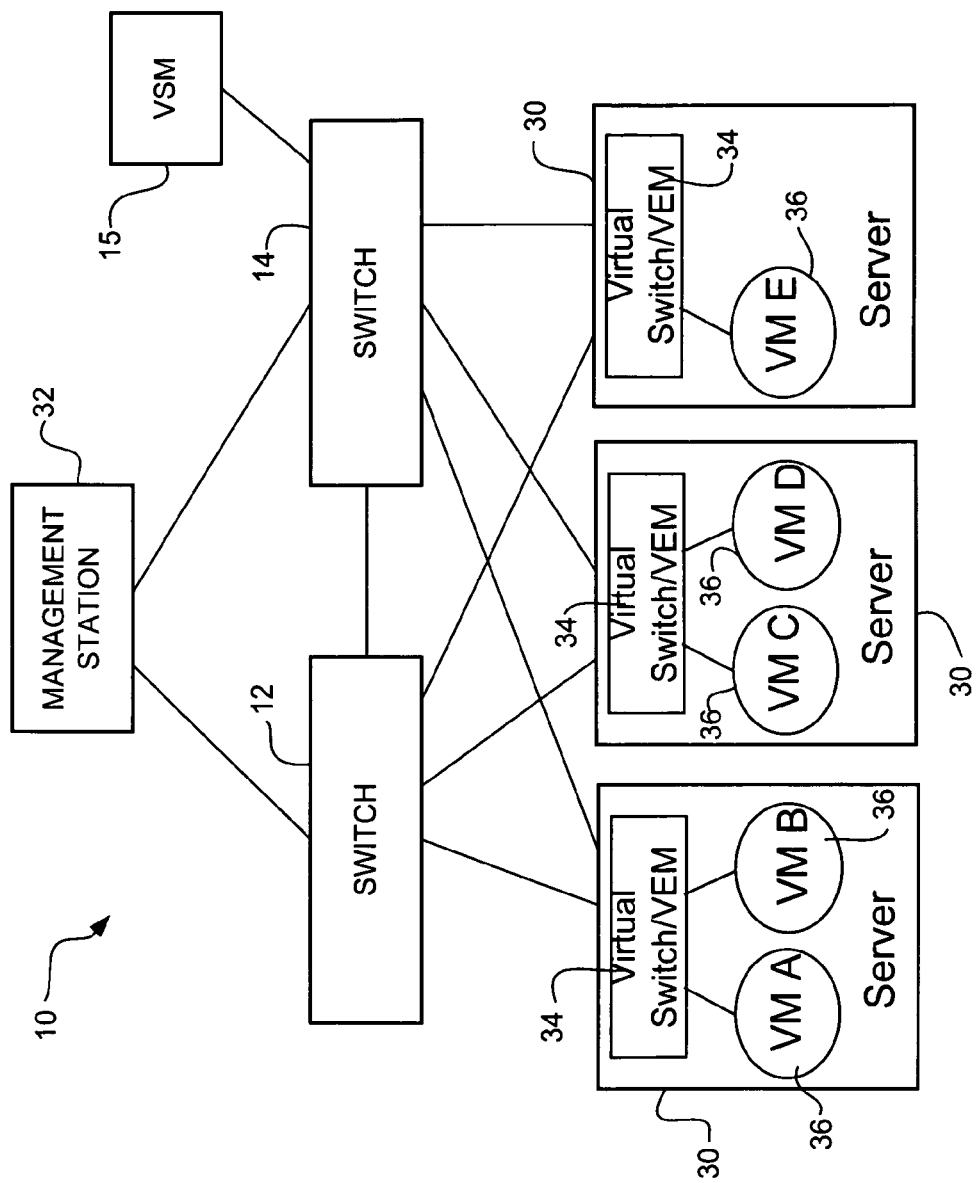
FIG. 1 illustrates an example of a network in which embodiments described herein may be implemented.

In one embodiment, a method generally comprises receiving information identifying switches connected to a group of physical ports at a network device comprising a plurality of virtual machines in communication with a virtual switch, creating subgroups at the network device, each of the subgroups comprising the physical ports connected to one of the switches, and assigning a virtual interface connecting the virtual switch to one of the virtual machines, to one of the subgroups for transmitting traffic from the virtual machine to one of the switches. Assignment of the virtual interface is performed during packet processing at the network device.

In another embodiment, an apparatus generally comprises a port channel manager for receiving information identifying switches connected to a group of physical ports at a network device and creating subgroups each comprising the physical ports connected to one of the switches. The apparatus further includes a virtual interface agent for assigning a virtual interface connecting a virtual switch to a virtual machine, to one of the subgroups. Traffic received from the virtual machine on the virtual interface is transmitted to one of the switches on one of the physical ports in the assigned subgroup.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, features relating to technical material that is known in the technical fields related to the invention have not been described in detail.

Virtualization allows one computer to do the job of multiple computers by sharing the resources of a single computer across multiple systems. Software is used to virtualize hardware resources of a computer, including, for example, the CPU, RAM, hard disk, and network controller, to create a virtual machine that can run its own operating system and applications. Multiple virtual machines share hardware resources without interfering with each other so that several operating systems and applications can be run at the same time on a single computer. Virtual machines may be used, for example, in a virtual infrastructure to dynamically map physical resources to business needs. Virtualization thus enables the aggregation of multiple servers, storage infrastructure, and networks into shared resources that can be delivered dynamically to applications as needed.

The embodiments described herein operate in the context of a data communication network including multiple network elements. Some of the elements in a network that employs the system may be network devices such as servers, switches, or routers. The network device may include, for example, a master central processing unit (CPU), interfaces, and a bus. The CPU preferably includes memory and a processor. The network device may be implemented on a general purpose network machine such as described below with respect to FIG. 2.

Referring now to the drawings, and first to FIG. 1, an example of a network 10 that may implement embodiments described herein is shown. The network 10 may be configured for use as a data center or any other type of network. It is to be understood that the simplified network shown in FIG. 1 is only one example, and that the embodiments described herein may be employed in networks having different configurations and types of network devices.

The network 10 shown in FIG. 1 includes network devices 12, 14, which may be hardware implemented network switches or other network devices configured to perform switching or routing functions. In the example shown in FIG. 1, switches 12 and 14 are connected to (i.e., in communication with) two network devices (e.g., servers, hosts) 30. The switches 12, 14 are also in communication with a management station 32 (e.g., virtualization management platform such as VMware Virtual Center management station, available from VMware of Palo Alto, Calif.). The management station 32 or one or more management functions may also be integrated into the switches 12, 14.

The servers 30 are also in communication with a Virtual Supervisor Module (VSM) 15. The VSM may be located in a physical appliance (e.g., server) in communication with the servers 30 and management station 32 via physical switches 12, 14. The VSM may also be a virtual appliance (e.g., virtual machine) installed at one of the servers 30 or the VSM may be installed at one of the switches 12, 14. The VSM runs a Data Center Operating System (DCOS) described below.

Each server 30 includes a virtual switch (also referred to herein as a Virtual Ethernet Module (VEM)) 34, and one or more virtual machines (VM A, VM B, VM C, VM D, VM E) 36. The virtual machines 36 share hardware resources without interfering with each other, thus enabling multiple operating systems and applications to execute at the same time on a single computer. A virtual machine monitor such as hypervisor (not shown) may be used to dynamically allocate hardware resources to the virtual machines 36. In the example of FIG. 1, VM A and VM B are located on a first server, VM C and VM D are located on a second server, and VM E is located on a third server, each server being physically separate from the other servers. The virtual machines 36 may each be moved between servers 30 based on traffic patterns, hardware resources, or other criteria.

The VSM 15 is configured to provide control/management plane functionality for the virtual machines 36 and control multiple virtual switches 34. The virtual switch 34 provides switching capability at the server 30 and operates as a data plane associated with the control plane of the VSM 15. The VSM 15 and virtual switch (VEM) 34 operate together to form a distributed virtual switch as viewed by the management station 32. The VSM 15 and VEM 34 may also be located together in a network device (e.g., switch 12, 14, server 30 or other network device in communication with the switches 12, 14 and servers 30).

Figure 2:
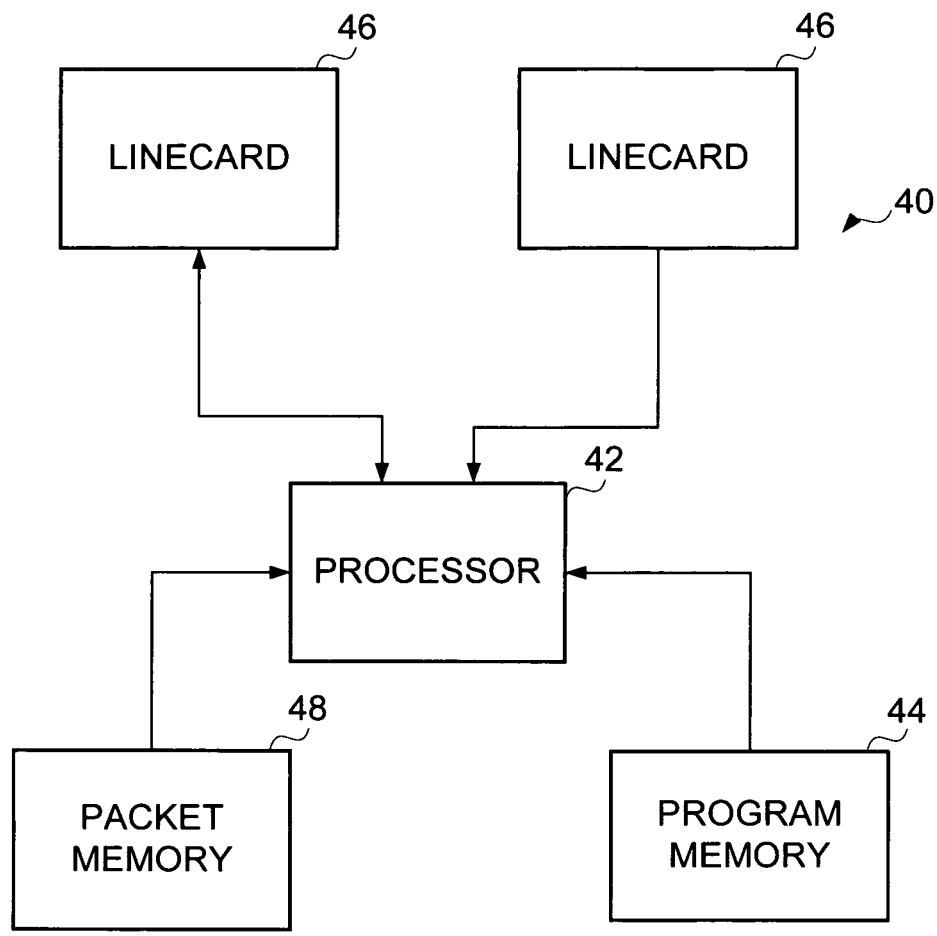
FIG. 2 depicts an example of a network device useful in implementing embodiments described herein.

FIG. 2 depicts a network device 40 that may be used to implement embodiments described herein. Network device 40 is configured to implement all of the network protocols and extensions thereof described herein. In one embodiment, network device 40 is a programmable machine that may be implemented in hardware, software, or any combination thereof. Logic may be encoded in one or more tangible media for execution by a processor. For example, processor 42 may execute codes stored in a program memory 44. Program memory 44 is one example of a computer-readable medium. Program memory 44 can be a volatile memory. Another form of computer-readable medium storing the same codes is a type of non-volatile storage such as floppy disks, CD-ROMs, DVD-ROMs, hard disks, flash memory, etc.

Network device 40 interfaces with physical media via a plurality of linecards (network interfaces) 46. Linecards 46 may incorporate Ethernet interfaces, DSL interfaces, Gigabit Ethernet interfaces, 10-Gigabit Ethernet interfaces, SONET interfaces, etc. As packets are received, processed, and forwarded by network device 40, they may be stored in a packet memory 48. To implement functionality according to the system, linecards 46 may incorporate processing and memory resources similar to those discussed above in connection with the network device as a whole. It is to be understood that the network device 40 shown in FIG. 2 and described above is only one example and that different configurations of network devices may be used.

Figure 3:
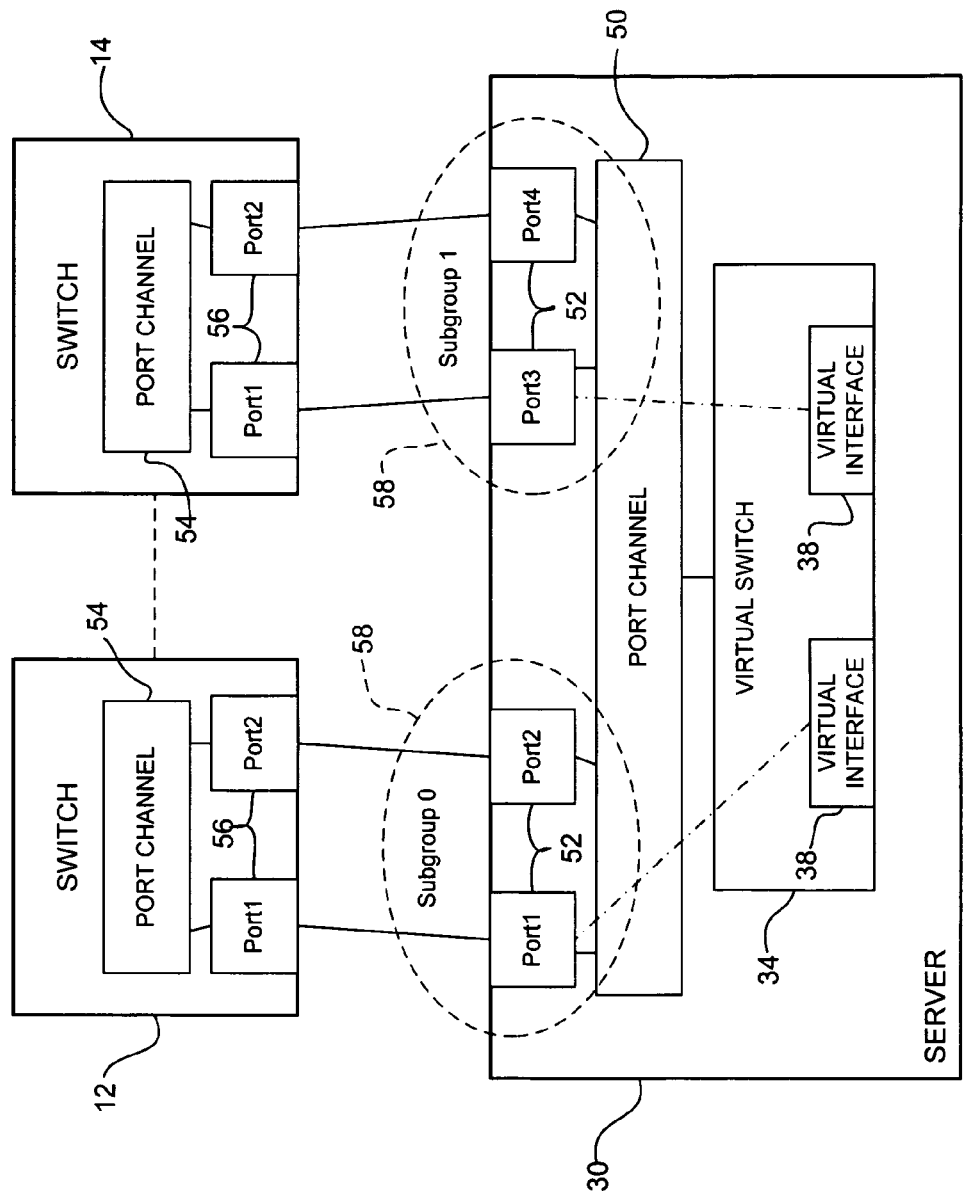
FIG. 3 illustrates subgroups configured on network devices of the network of FIG. 1.

FIG. 3 illustrates a server/host 30 in communication with two upstream switches (e.g., access switches 12, 14 of FIG. 1). The server 30 includes the virtual switch 34 and virtual machines 36 (not shown) of FIG. 1. Each server 30 and switch 12, 14 includes a port channel (PC) 50, 54 and a plurality of physical ports (Port1, Port2, Port3, Port4) 52, 56. The physical ports 52 on the server 30 are connected to physical ports 56 on the switches 12, 14.

Referring to FIGS. 1 and 3, the virtual machines 36 are in communication with the virtual switch 34 via virtual network interface cards (VNICs) which connect to virtual Ethernet interfaces 38 at the virtual switch. The server 30 includes an Ethernet port 52 for each physical network interface card at the server. The Ethernet ports 52 are aggregated at the port channel 50. The virtual switch 34 is in communication with the network via the physical Ethernet interfaces. The virtual switch 34 switches traffic between the virtual machines 36 and the physical network interface cards.

If the physical ports of the port channel are connected to two different upstream switches for redundancy (as shown in FIGS. 1 and 3), the following issues may arise without implementation of the embodiments described herein. MAC addresses of virtual ports (interfaces) behind the virtual switch 34 could flap across switches 12, 14 if the load balancing algorithm is not based on a source MAC address. For example, during egress of traffic from the server 30, a port channel hash algorithm could pick any port from the four port members 52 of the port channel 50, which will result in MAC flapping in upstream switches 12, 14 if they are Layer 2 (L2) connected. Also, virtual ports 38 will receive duplicate packets from the network for broadcast, unknown unicast, and multicast if the two upstream switches 12, 14 are connected. Another issue is that virtual ports behind VEM 34 may receive their own traffic for broadcast, unknown unicast, and multicast.

Embodiments described herein provide an Asymmetric Port Channel (APC) (also referred to as host mode virtual Port Channel (vPC)), which prevents the problems noted above.

Asymmetric Port Channel refers to a port channel wherein the members are connected to different upstream switches. In the example shown in FIG. 3, ports 52 of a single port channel 50 are connected to two upstream switches 12, 14. The group of ports 52 are assigned to one of two subgroups (subgroup 0 and subgroup 1) 58. As described in detail below, subgroups 58 are created and virtual interfaces (virtual Ethernet ports) 38 of the virtual switch 34 are pinned to one of the subgroups. All of the traffic from the virtual interface 38 goes out through the pinned subgroup 58. This addresses MAC flapping issues. Each type of broadcast, unknown unicast, and multicast packets are accepted on one of the subgroups 58. This addresses the issue of virtual ports receiving duplicate packets. Packets for virtual ports 38 are accepted from pinned (associated) subgroups 58.

The subgroup 58 is a grouping of member interfaces 52 of a port channel 50 that are connected to the same upstream switch 12, 14. Pinning (also known as static pinning) provides the ability to forward traffic from the virtual interface 38 or from a VLAN to a specific member 52 of a port channel 50. Subgroups 58 are created based on information received from upstream switches 12, 14. The information may be communicated utilizing Cisco Discovery Protocol (CDP) or other suitable protocol. CDP is transmitted from the switches 12, 14 and informs other network devices of their existence. It is to be understood that CDP is only one example and that other protocols such as Link Layer Discovery Protocol (LLDP) or any other means for transmitting device information, may be used. The information includes a device ID which is used to identify the node that is attached to the port receiving the information. The network device information is received from the upstream switches 12, 14 and the subgroups 58 are preferably created automatically based on the received information. Thus, no manual intervention is required. Subgroups 58 can also be created manually by assigning subgroup IDs to the member ports 52 of the port channel 50 (i.e., receiving switch information from a user). Therefore, a user is still able to load balance across all of the links within a subgroup. All subgroups 58 are in an active-active state.

It is to be understood that the embodiment shown in FIG. 3 with two subgroups is only one example and that any number of subgroups may be used.

Figure 4:
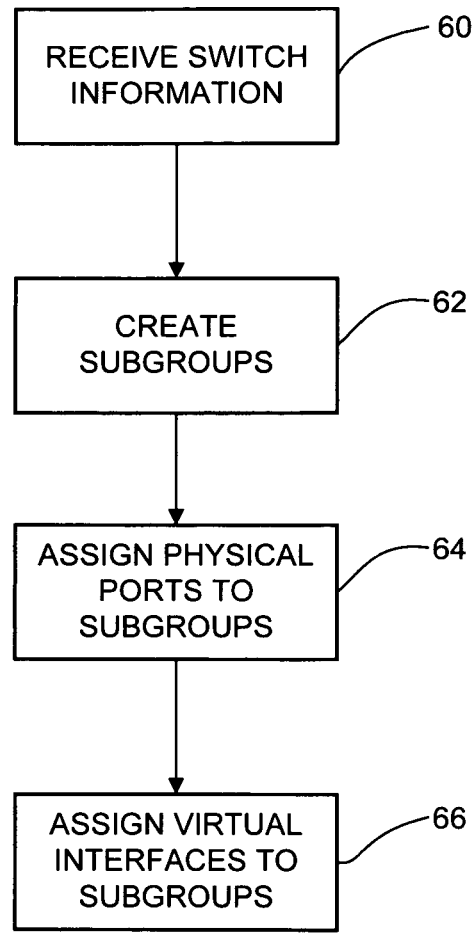
FIG. 4 is a flowchart illustrating an overview of a process for creating the subgroups and assigning virtual interfaces to the subgroups, in accordance with one embodiment.

FIG. 4 is a flowchart illustrating an overview of a process for creating subgroups and pinning the virtual interfaces to subgroups. At step 60, a port channel manager receives information regarding switches 12, 14 connected to server 30 including a plurality of virtual machines 36. Subgroups 58 are created (step 62) and each of the physical ports 52 of the server 30 are assigned to one of the subgroups (step 64). Each subgroup 58 contains the physical ports 52 connected to one of the switches 12, 14. As previously discussed, subgroups 58 can be created either automatically or manually. One option for manually creating subgroups is through a CLI (command-line interface), where the user configures subgroup IDs. Automatic creation of subgroups is through the use of information received from the upstream switches 12, 14. The port channel manager (described below) assigns subgroup IDs to member ports 52 of the port channel 50 based on the information received from upstream switches 12, 14.

Virtual interfaces 38 are attached to one of the subgroups 58 (step 66), and a member port 52 within the subgroup 58 is selected. The selection may be, for example, based on a user configured load-balancing algorithm during egress packet processing at the server 30. The egress packet processing thus involves two steps; the first is to select a subgroup 58, and the second is to select a member port 52 within the subgroup.

Figure 5:
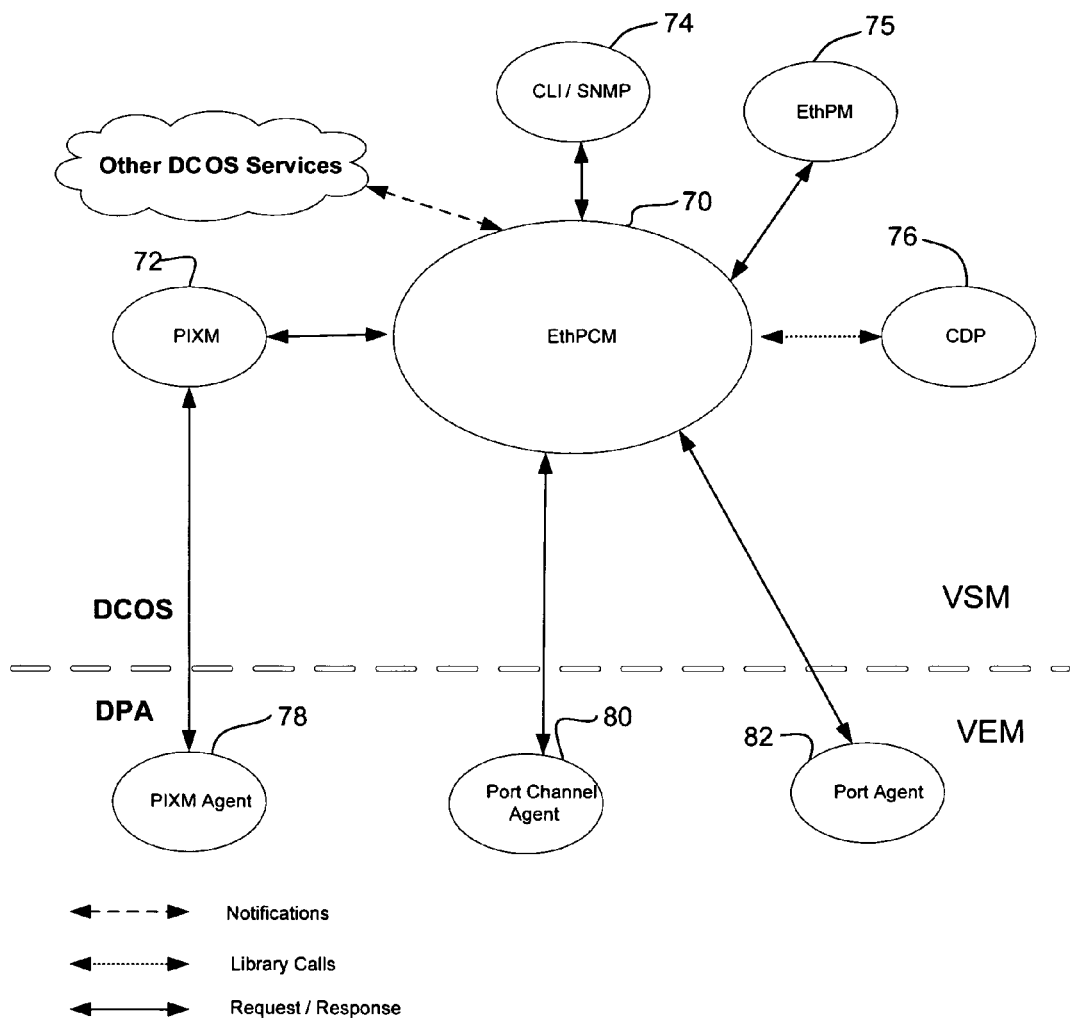
FIG. 5 illustrates components of a data center operating system and a data path agent.

FIG. 5 illustrates components of the Data Center Operating System (DCOS) (also referred to as Nexus Operating System (NXOS)) and a Data Path Agent (DPA), in accordance with one embodiment. The DCOS operates, for example, on the VSM 15. The DPA is a user process on a host (server) and may operate, for example, at the VEM 34. DCOS includes a port index manager (PIXM) 72, an Ethernet Port Channel Manager (EthPCM) 70 that communicates with CLI/SNMP (Command-Lin Interface/Simple Network Management Protocol) 74, EthPM (Ethernet Port Manager) 75, and CDP 76. As noted above, CDP is just one example of a protocol used to obtain switch information. The DPA includes an Index Port Manager Agent (PIXM Agent) 78, a Port Channel (PC) Agent 80, and a Port (Virtual Interface) Agent 82. It is to be understood that the configuration and components shown in FIG. 5 are only an example and that other configurations and components may be used without departing from the scope of the invention. For example, the functions of the PIXM 72, EthPCM 70 and EthPM 75 may be combined into a port channel manager or broken up in other variations. Details of the interaction between components are described below.

Figure 6:
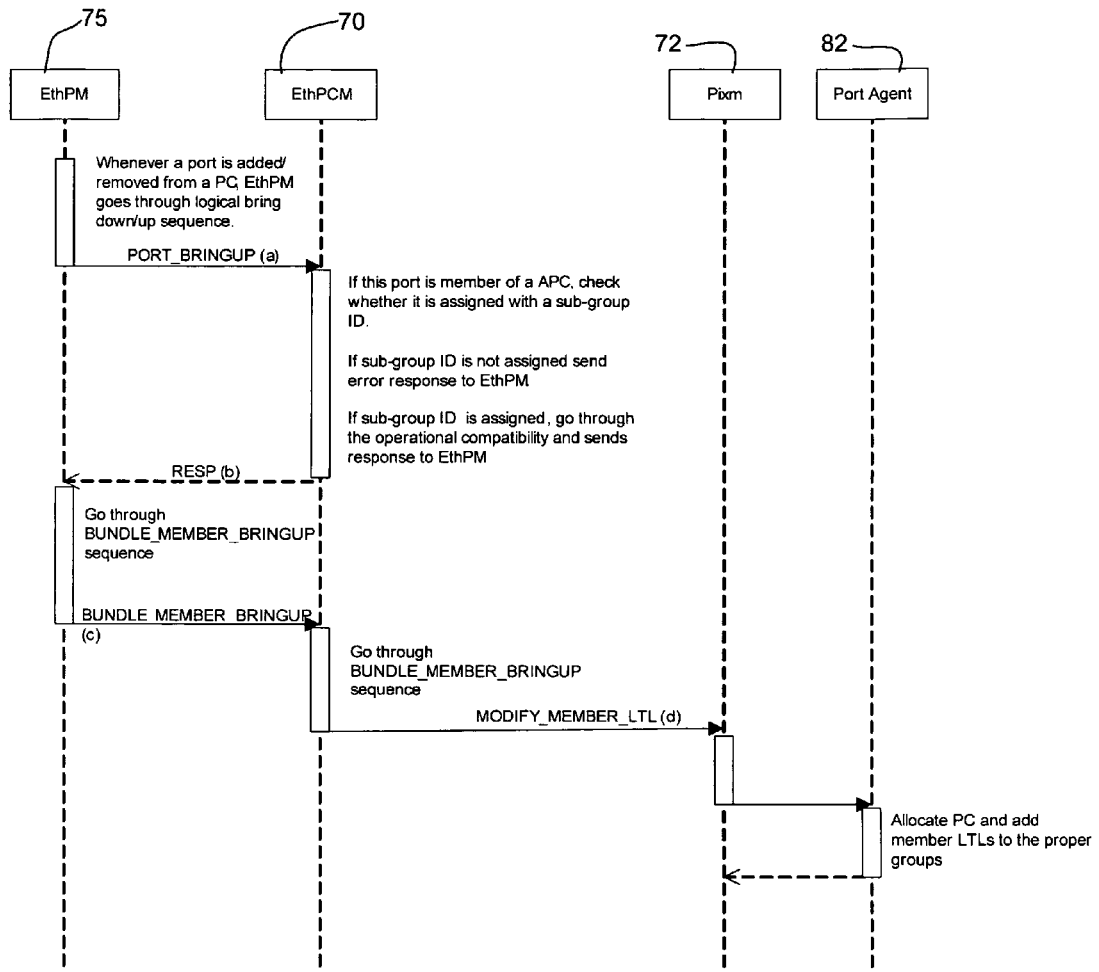
FIG. 6 illustrates communication between components of the data center operating system and data path agent.

FIG. 6 illustrates a port bring up sequence, according to one embodiment. In the example shown in FIG. 6, communication is between the EthPM 75, EthPCM 70, PIXM 72, and Port Agent 82. When a port 52 is added/removed to/from a port channel 50 it goes through a logical bring down and up sequence. As a result, EthPCM 70 receives a bringup message (a) from the EthPM 75, which manages the physical ports. Upon receiving the bringup message from EthPM 75, EthPCM 70 checks if the port is a member of a port channel 50.

If it is a member of a port channel 50 and the port channel has the subgroups configured, it is an APC. For APC, EthPCM 70 checks whether the port 52 that is coming up is assigned a subgroup ID. If it is not assigned, EthPCM 70 sends an error response to the EthPM 75. If the port 52 is not assigned a subgroup ID, the port will be put in down state. If subgroup ID is assigned, a response is sent to the EthPM 75 (indicated at (b)). A new TLV (type, length, value) is added to carry subgroup ID information down to the port agent 82 at the VEM 34. The bundle member bringup is shown at (c) and (d) in FIG. 6. The port agent 82 stores the group ID in a port entry data structure. Whenever a subgroup ID is assigned to a port, EthPCM 70 sends REINIT message to EthPM 75 if the port was down.

The following describes details of subgroup selection and pinning, in accordance with one embodiment. Each virtual interface 38 is pinned to one of the subgroups 58. When traffic arrives from a virtual interface a check is made for sub_group_id in a source port entry structure. If a subgroup is assigned, the same subgroup is used, otherwise, a subgroup is assigned. A user configured load balance hash algorithm may be applied to select a member port 52 from the selected subgroup 58. A round robin algorithm may also be used for the assignment of sub_group_id to the virtual interfaces 38. For example, the subgroup 58 can be selected by a round robin algorithm or by a hash algorithm on LTL (Local Target Logic) index of the virtual interface 38. When re-pinning takes place, a MAC move packet is sent on the new subgroup. Pinning may be changed when all of the links in the subgroup 58 to which the virtual interface 38 is pinned goes down, or as a result of load balancing the traffic on all subgroups.

Once the subgroup 58 is assigned to the virtual interface, the virtual interface is pinned to one of the ports 52.

Pinning may also be performed based on VLAN. When a user configures preferred VLAN list on a member port, the EthPCM 70 pushes this information down to the DPA. This information is stored at the DPA in a data structure which can be indexed by VLAN. For a given VLAN there is a preferred LTL index.

There are two types of pinning: dynamic and static. Dynamic pinning is the process of selecting a member port 52 based on a load balancing algorithm, flow parameters, and type of packet. Static pinning configuration allows a user to select a specific member 52 of a port channel 50 to carry traffic from a virtual interface/VLAN. If there is a static pinning configuration on the virtual interface/VLAN, all of the traffic from that virtual interface/VLAN is carried on the configured physical network interface card. This indirectly influences the subgroup selection in the case of asymmetric port channels. A user can pin a particular virtual interface or VLAN to a specific member port 52. This configuration overrides the load balancing process of selecting a member 52 in a port channel 50.

In one embodiment, beaconing may be used to detect whether or not the upstream switches 12, 14 are connected. The VEM 34 periodically sends beacon packets on one of the subgroups 58 for each VLAN configured on the PC 50 and expects it to be received on the other subgroup. Beacon packets are preferably sent on one subgroup 58 and processed on the other (second) subgroup. The beacon time interval and number of consecutive misses to detect that the upstream switches are not connected can be configurable through CLI, for example. The beacon packets are sent on all of the allowed VLANs of the asymmetric port channel. If beacon packets are not received consecutively on the second subgroup for a configured number of times, the upstream switches 12, 14 are considered to be not connected. When the upstream switches 12, 14 are detected as disconnected, Duplicate Packet Detection (DPD) is turned off and all of the flooding packets are sent and received on both subgroups 58.

As previously discussed, duplicate packets will be received for unknown unicast, multicast floods, and broadcast on both subgroups 58 of asymmetric port channel if the upstream switches 12, 14 are connected. Therefore, one of the duplicate packets needs to be discarded. In accordance with one embodiment, the packets will be discarded as follows.

In the case of known unicast, packets are accepted only on the subgroup 58 where the destination LTL (virtual interface MAC is destination) is latched, and discarded on the other subgroup. All unknown unicast, multicast floods and broadcast packets are accepted on only one of the subgroups (e.g., subgroup 0). The same will be discarded on the other subgroup (e.g., subgroup 1). If it is determined (e.g., through beaconing logic described above) that the upstream switches 12, 14 are not connected, the unknown unicast, multicast, and broadcast packets are accepted on both subgroups 58 (subgroup 0 and subgroup 1).

Figure 7:
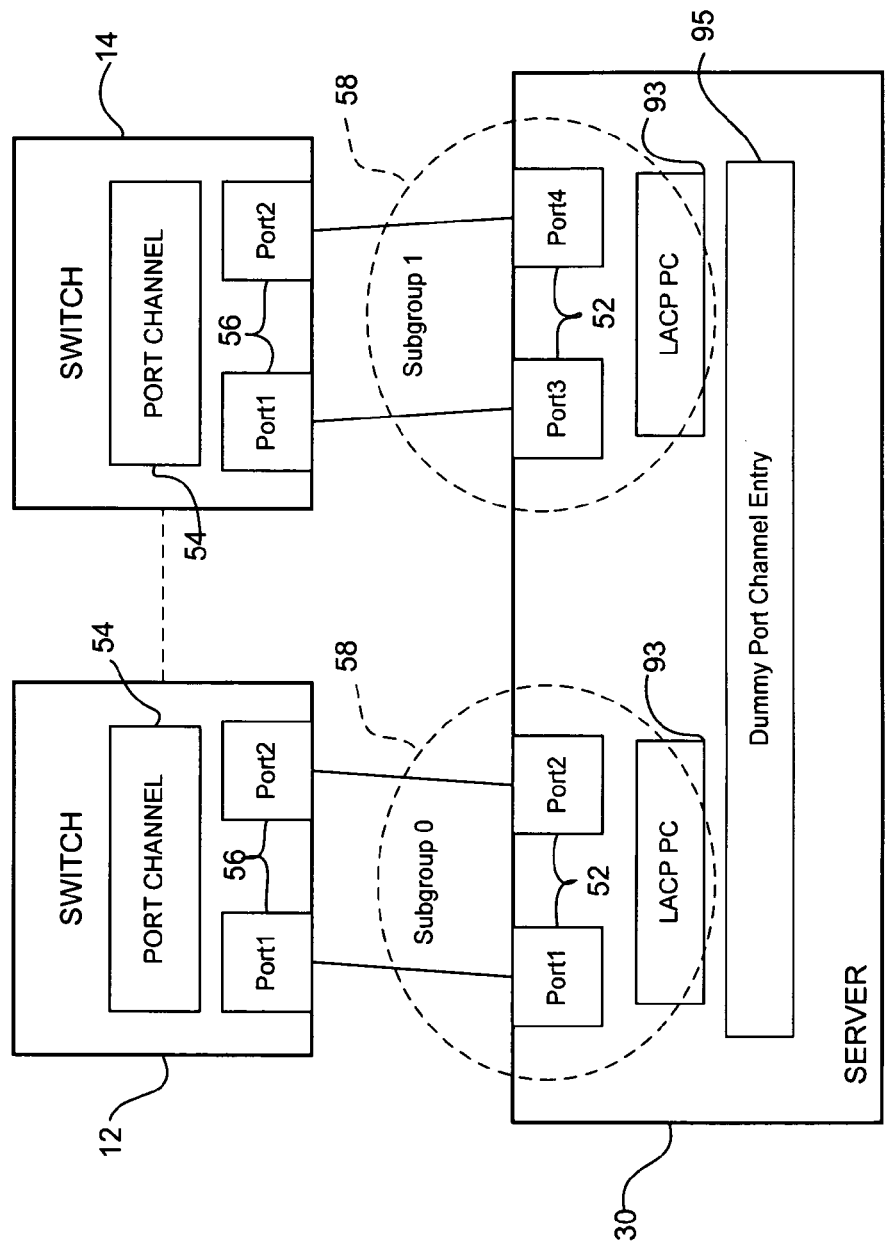
FIG. 7 illustrates port channels configured for use with Link Aggregation Control Protocol.

FIG. 7 illustrates APC with Link Aggregation Control Protocol (LACP). For LACP APC, separate independent port channels (LACP PCs) 93 are created; one for each upstream switch 12, 14. Once LACP is operating, a check is performed to see if there is any way to identify if these port channels have the same configuration. A message is sent from EthPCM 70 to the DPA to create a dummy port channel entry 95 and link these LACP PCs 93, as shown in FIG. 5. CDP information is not needed to create subgroups. It is automatically done by using LACP. Upon receiving a message from the EthPCM 70, the dummy port channel entry 95 is created with two subgroups 58. Each subgroup has one member port which is an LACP PC LTL. During ingress stage of packet processing, the source LTL is replaced with the port channel's LTL. During lookup stage, learning of source address takes place. If a packet is destined to be sent on the APC, source LTL will be the virtual port's LTL and destination LTL will be the dummy port channel's LTL, because the learning took place on this LTL.

During egress stage of packet processing, the following steps take place. Dummy port channel entry is obtained from destination LTL's port entry. Where there are two subgroups, each has one member port. The subgroup ID is obtained from source LTL's port entry. If it is a valid one, the subgroup is selected. Otherwise a sub_group_id (latching) is assigned as described for subgroup selection/latching. The port channel's entry is obtained from the selected subgroup where there are member physical port LTLs. The user configured load balance algorithm is applied on the port channel entry obtained as described above.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
    receiving information identifying switches connected to a group of physical ports at a network device comprising a plurality of virtual machines in communication with a virtual switch;
    creating subgroups at the network device, each of said subgroups comprising the physical ports connected to one of the switches; and
    assigning a virtual interface connecting the virtual switch to one of the virtual machines, to one of said subgroups for transmitting traffic from the virtual machine to one of the switches, wherein assigning a virtual interface is performed during packet processing at the network device.

2. The method of claim 1 further comprising assigning one of said subgroups for one or more type of packets, wherein said types include broadcast, unknown unicast, and multicast.

3. The method of claim 1 wherein creating said subgroups comprises automatically creating said subgroups based on said received information.

4. The method of claim 1 wherein assigning said virtual interface to one of said subgroups comprises applying a round robin algorithm to indices of said virtual interfaces.

5. The method of claim 1 wherein assigning said virtual interface to one of said subgroups comprises applying a hash algorithm to indices of said virtual interfaces.

6. The method of claim 1 further comprising changing the assignment of said virtual interface based on load balancing of traffic between said subgroups.

7. The method of claim 1 wherein assigning said virtual interface to one of said subgroups further comprises selecting one of the physical ports of the subgroup.

8. The method of claim 7 wherein selecting one of the physical ports comprises applying a load balancing algorithm.

9. The method of claim 1 further comprising transmitting a message from one of the physical ports assigned to a first of said subgroups and receiving said message on one of the physical ports assigned to a second of said subgroups to check connectivity of the switches, if the switches are not connected, transmitting unknown unicast, multicast, and broadcast packets to all of said subgroups, and if the switches are connected, transmitting said unknown unicast, multicast, and broadcast packets to only one of said subgroups.

10. The method of claim 1 further comprising discarding duplicate packets received at one of said subgroups if the switches are connected.

11. An apparatus comprising:
    a processor for receiving information identifying switches connected to a group of physical ports at a network device and creating subgroups each comprising the physical ports connected to one of the switches, and assigning a virtual interface connecting a virtual switch to a virtual machine, to one of said subgroups;
    wherein traffic received from the virtual machine on said virtual interface is transmitted to one of the switches on one of the physical ports in said assigned subgroup.

12. The apparatus of claim 11 wherein the processor is operable to assign one of said subgroups for one or more type of packets, wherein said types include broadcast, unknown unicast, and multicast.

13. The apparatus of claim 11 wherein the processor is configured to apply a round robin algorithm to indices of said virtual interfaces to assign said virtual interface to one of said subgroups.

14. The apparatus of claim 11 wherein the processor is configured to apply a hash algorithm to indices of said virtual interfaces to assign said virtual interface to one of said subgroups.

15. The apparatus of claim 11 wherein the processor is configured to change the assignment of said assigned virtual interface based on load balancing of traffic between the subgroups.

16. The apparatus of claim 11 wherein the processor is configured to select one of the physical ports of said assigned subgroup.

17. Logic encoded in one or more non-transitory computer-readable medium for execution and when executed operable to:
- receive information identifying switches connected to a group of physical ports at a network device comprising a plurality of virtual machines in communication with a virtual switch;
- create subgroups at the network device, each of said subgroups comprising the physical ports connected to one of the switches; and
- assign a virtual interface connecting the virtual switch to one of the virtual machines to one of said subgroups for transmitting traffic from the virtual machine to one of the switches.

18. The logic of claim 17 wherein the logic is operable to assign one of said subgroups for one or more type of packets, wherein said types include broadcast, unknown unicast, and multicast.

19. The logic of claim 17 wherein the logic is operable to change the assignment of said virtual interface based on load balancing of traffic between said subgroups.

20. The logic of claim 17 wherein assignment of said virtual interface to one of said subgroups further comprises selection of one of the physical ports of said assigned subgroup.

* * * * *